United States Patent [19]

Heath

[11] Patent Number: 4,638,841

[45] Date of Patent: Jan. 27, 1987

[54] DEVICE FOR HANDLING FLUIDS DRAINED FROM A VEHICLE

[76] Inventor: Thomas E. Heath, 2630 Fujiama Dr., Clearwater, Fla. 33520

[21] Appl. No.: 799,149

[22] Filed: Nov. 18, 1985

[51] Int. Cl.$^4$ .............................................. B65B 3/04
[52] U.S. Cl. ..................................... 141/98; 141/231; 141/286; 141/339; 184/1.5; 184/106
[58] Field of Search ............... 141/1, 291, 281, 311 A, 141/378, 392, 98, 231, 286, 331–349; 184/1.5, 106; 248/354 R; 269/15, 17

[56] References Cited

U.S. PATENT DOCUMENTS 4,235,264  11/1980  Rau et al. ............................... 141/231

Primary Examiner—Houston S. Bell, Jr.
Attorney, Agent, or Firm—Ronald E. Smith; Miguel A. Valdes

[57] ABSTRACT

A device for handling liquid fluids drained from vehicles. The device includes a fluid storage tank, a container for holding fluid to be recycled, a funnel having an anti-splash mat positioned therein to prevent the splashing of fluid being drained, and a valve means operative to direct the fluid to either the storage tank or to the recycle container for subsequent reintroduction into the vehicle. The valve means also includes means for connecting an air compressor to the storage tank so that compressed air may enter the tank and expel the fluid therefrom through a hose. The storage tank is mounted on casters for mobility and the size of the funnel's opening is sufficiently large to capture fluid flowing from widely spaced sources.

3 Claims, 3 Drawing Figures

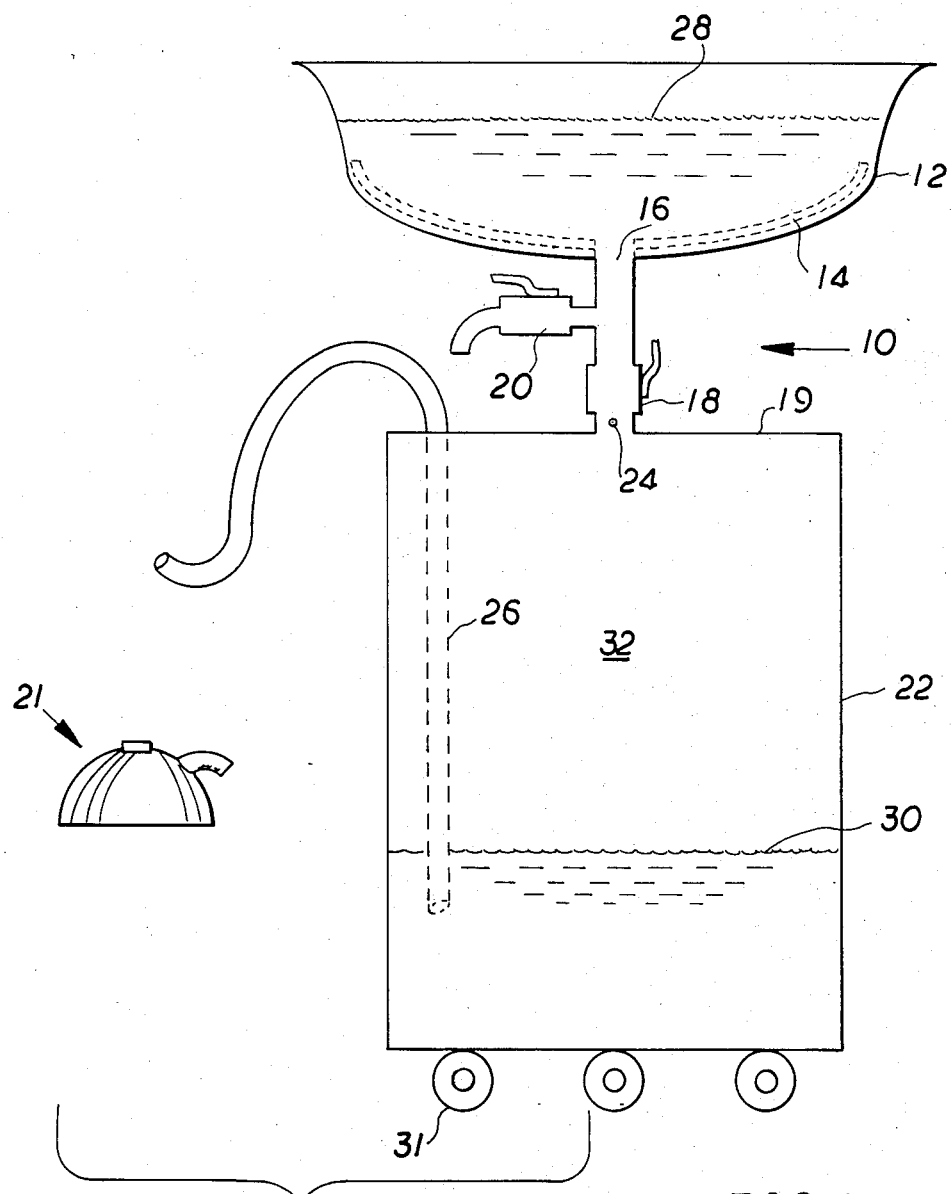
FIG_1

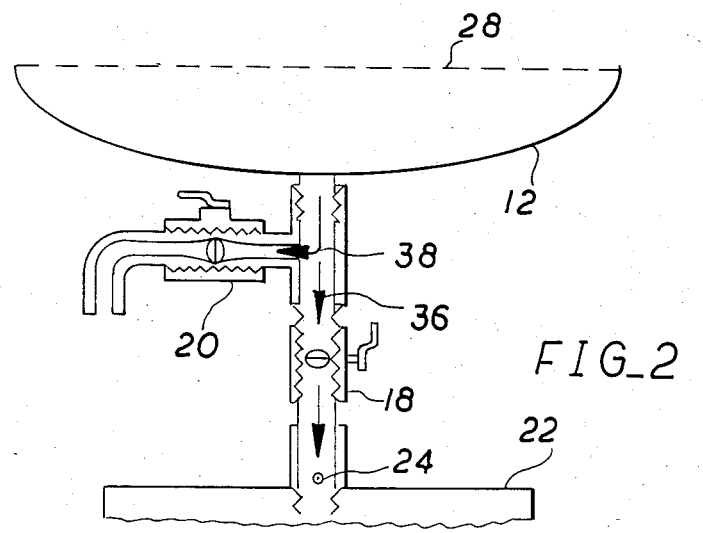
FIG_2
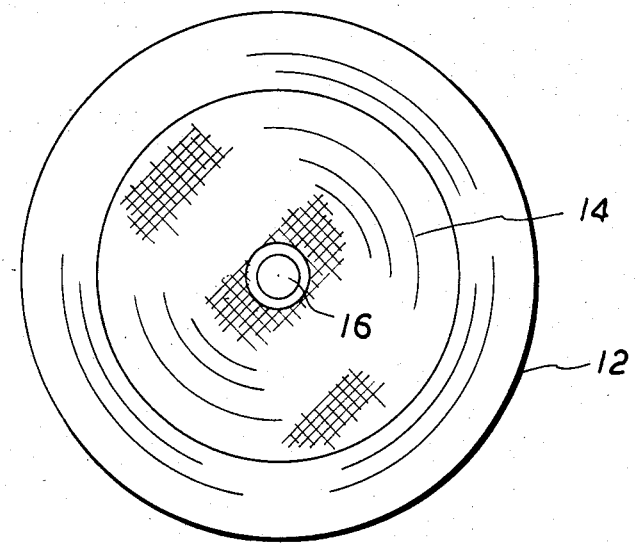
FIG_3

DEVICE FOR HANDLING FLUIDS DRAINED FROM A VEHICLE

BACKGROUND OF THE INVENTION

1. Field of the Invention

This invention relates, generally, to devices having utility in the collection and disposal of fluids drained from vehicles, and more specifically relates to a device that also includes a means whereby fluid drained from a vehicle may be reintroduced thereinto if a decision is made against disposal thereof.

2. Description of the Prior Art

The handling of fluids drained from vehicles presents a major problem to auto mechanic shops and other facilities that do maintenance, inspection or repair work. One of the many problems associated with the handling of dirty fluids is that the fluids have a tendency to splash messily when they contact a container or funnel. This splashing action results in fluid spilling on the shop floor, which creates a hazardous and difficult to clean condition. The splashing action also results in staining of the mechanic's clothing.

To adequately inspect a system in order to present an informed job estimate to a customer, the mechanic should first drain the fluid from the system, whether it be a transmission, crankcase, or other system. If the customer decides against having the work done, the system has to be filled with new fluid if the old fluid cannot conveniently be stored temporarily in a suitable container. This situation results in unnecessary expenses to the shop.

Commercially available funnels are also unsatisfactory because their dimensions are not suitable. For example, most transmissions are elongate; thus, when a transmission is inspected, fluid flows out at widely spaced locations. Some fluid can be collected into a drum by a funnel of the type found in the prior art, but some fluid will flow to the floor of the shop due to the inadequate size of the funnel.

The drums which hold old fluids are also troublesome. They become quite heavy as they fill up, and are difficult to move; moreover, they are difficult to empty as they are not provided with any emptying means.

The drums now in use are open-topped drums, and they are emptied simply by tipping them over.

There are several U.S. patents related to fluid-draining devices for autos. U.S. Pat. No. 2,717,660, issued Sept. 13, 1955 to Reisert and others, discloses a tank for receiving oil drained from automotive vehicles. With this device the fluid can not be diverted to another container.

U.S. Pat. No. 3,513,941, issued May 26, 1970 to Becnel, shows a fluid change means for automatic transmissions. This device automatically disposes of the old fluid and refills the transmission with new fluid. Since this is a closed circuit operation the mechanic is unable to return the old fluid to the transmission.

U.S. Pat. No. 4,274,645, issued June 23, 1981 to Ferguson and others shows a drain oil collection tank for use in an automobile service station. This device lacks means to divert the fluid to another container and has no means to minimize the splashing action of the fluid.

U.S. Pat. No. 4,235,264, issued Nov. 25, 1980 to Rau and others, and U.S. Pat. No. 4,095,672, issued June 20, 1978 to Senese, disclose the use of one container only for the fluid.

It is a primary object of this invention to provide a device that collects drained fluid in a waste container or a recycle container at the selection of the user of the device.

Another object of this invention is to provide a draining device that reduces fluid splashing.

Still another object of this invention is to provide a draining device that expels the accumulated fluid under air pressure during the disposal operation.

Another important object is to provide a storage tank that can be moved easily, and emptied easily.

SUMMARY OF THE INVENTION

The invention accomplishes these and other objects by providing a device for collecting drained vehicular fluids which includes a wide-mouth funnel for directly receiving the drained fluid from the vehicle, a first and a second container for collecting the fluids and a valve means for directing the fluid to either the first or second container at the option of the device operator.

The funnel has a mat at the bottom to prevent splashing of the fluids.

The valve means includes a pair of valves; when both are closed, fluid drained from the vehicle is held in the funnel and can enter neither container. This allows the device operator to inspect the quality of the drained fluid; if the quality is good and the inspection indicates that the fluid could be reintroduced into the vehicle without harm, the operator can then elect to manipulate the valve system to route the fluid to the recycle container. Otherwise, the operator can route the fluid to the storage container where it will stay until disposed of.

The valve means also includes an air valve for directing air from an outside source into the storage container to expel under pressure the accumulated fluids therein through a hose connected to the storage container.

The storage tank is provided in the form of a drum having a cover; the cover provides an advantageous support surface upon which is mounted the funnel and valve system. Thus, the funnel and drum form a unit; the tank is mounted on casters as well so that the tank/funnel apparatus can be easily rolled into position as needed and easily rolled to a remote location when not needed.

Several significant features and advantages are provided by the novel device. The funnel mat prevents spilling of fluids on the shop floor and staining of mechanic's clothing. This reduces the possibility of accidents and the discomfort of the mechanics at work. Also, the valve means provides the mechanic with the alternative of directing the drained fluids to the disposal tank or to the recycle container. If a customer decides against authorizing a repair job, the old fluid may be reintroduced into the vehicle, even if it appears to be of poor quality. Likewise, if the inspection reveals that the vehicle system is functioning properly, but that the fluid needs to be replaced, the old fluid may be directed to the disposal tank and new fluid may be used for the vehicle. This feature of the invention prevents unnecessary expenses for the automotive shop.

From time to time, a shop will need to drain the disposal tank; the present invention provides for the expulsion of accumulated fluids under air pressure and thus provides the first storage tank specifically provided with means for emptying a drum in the absence of a need for overturning it.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a schematic diagram of the novel device;

FIG. 2 is a schematic diagram of the valve means of the novel device; and

FIG. 3 is a schematic top view of the funnel according to the invention.

Similar reference numerals refer to similar parts throughout the several view of the drawings.

DETAILED DESCRIPTION OF THE PREFERRED EMBODIMENT

Referring now to FIG. 1, it will there be seen that an embodiment of the novel device that incorporates the teachings of this invention is designated by the reference numeral 10 as a whole.

Device 10 includes wide-mouth funnel 12, anti-splash mat 14 positioned in overlying relation to the bottom thereof as shown, valve system 16 including disposal valve 18 and recycle valve 20, portable recycle container 21 and a disposal tank 22 having a lid 19.

Liquid fluid drained from a vehicle but not yet directed to either recycle container 21 or disposal tank 22 is denoted 28; fluid destined for disposal is denoted 30. Due to the novel valve system of the present invention, fluid 28 can be detained in funnel 12 for inspection purposes. Upon completion of the inspection and discussion of the inspection results with a customer, fluid 28 can then be handled in a manner consistent with the customer's directions.

Mat 14 is provided to prevent splash action of fluid 28 as it falls under the influence of gravity from a vehicle fluid discharge opening, not shown.

If a decision is made to discard fluid 28 after inspection of the vehicle system, recycle valve 20 is closed and disposal valve 18 is opened. Conversely, if a decision is made to recycle the fluid, i.e., to pour it back into the appropriate charge spout of the vehicle, valve 18 is closed and valve 20 is opened.

To dispose accumulated fluid 30, an air source, not shown, is connected to port 24 so that air mass 32 exerts pressure against fluid 30, in accordance with Boyle's Law, thereby expelling said fluid out of tank 22 through hose 26. Hose 26 extends through an aperture formed in drum closure member 19.

Casters 31 provide mobility to the novel apparatus.

FIG. 2 shows in greater detail the valve means of the novel device, which includes valves 18, 20 and port 24. The valve means allows fluid 28 to flow in the direction indicated by arrow 36 toward tank 22 when valve 18 is opened and valve 20 is closed. In the alternative, fluid 28 flows in the direction indicated by arrow 38 toward container 21 when valve 20 is opened and valve 18 is closed.

FIG. 3 shows mat 14 positioned centrally of funnel 12 on the bottom surface thereof. When the fluid drained from the vehicle system under inspection makes contact with mat 14, the splash action is effectively minimized by the presence of the mat in that it absorbs the kinetic energy of the falling fluid and converts that energy into heat energy. In the absence of mat 16, fluid 28 will spill outside funnel 12 onto the shop floor.

The wide mouth of funnel 12 is important and constitutes an important feature of the invention as it enables the simultaneous collection of all the liquid fluids flowing from transmissions and the like, which feature contrasts with the narrow mouth, inadequate funnels of the prior art.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A device for handling liquid fluids drained from vehicles, comprising:

a wide-mouth funnel having dimensions sufficient to collect fluid draining from a vehicle at widely spaced locations;

a storage tank in the form of a drum;

a funnel downspout member depending to said funnel, said downspout member disposed in fluid communicating relation to said funnel and said drum;

said drum having a substantially imperforate closure means;

a portable container for transiently holding fluids;

a drum bypass means;

a first valve member positioned in said drum bypass means;

said drum bypass means provided in the form of a passageway confluent with said downspout member and disposed normal thereto;

said drum bypass means communicating with said downspout member in an upper portion of said downspout member just downwardly of said funnel;

a second valve member, positioned in said downspout member below the intersection of said bypass means and said downspout member;

an air inlet member, positioned in said downspout member below said second valve member;

said air inlet means confluent with an air compressor means;

an elongate hose member having a first end immersed in fluid collected in said drum and having a second end extending outwardly of said drum through an aperture formed in the closure means for said drum;

said air compressor means adapted to introduce compressed air into said air inlet member so that when said second valve member is closed, compressed air enters said drum and expels fluids collected therein through said hose member to a fluid collection means positioned externally of said drum;

whereby when said first valve member is open and said second valve member is closed, fluid contained in said funnel is routed to said container;

and whereby when said first valve member is closed and said second valve member is open, fluid contained in said funnel is routed to said drum.

2. A fluid handling device, as described in claim 1, further comprising:

an anti-splash mat positioned in overlying relation to a lower surface of said funnel;
said mat formed of a suitable plastic material.

3. A fluid handling device, as described in claim 1, wherein said drum is mounted on caster members to enhance its mobility.

* * * * *